United States Patent [19]

Kawano

[11] Patent Number: 5,066,966
[45] Date of Patent: Nov. 19, 1991

[54] HOLDING MECHANISM FOR A CAMERA

[75] Inventor: Kiyoshi Kawano, Rochester, N.Y.

[73] Assignee: Asahi Kogaku Kogyo Kabushiki Kaisha, Tokyo, Japan

[21] Appl. No.: 497,351

[22] Filed: Mar. 22, 1990

[30] Foreign Application Priority Data

Mar. 27, 1989 [JP] Japan .................. 1-34637[U]

[51] Int. Cl.$^5$ .............................. G03B 29/00
[52] U.S. Cl. .................... 354/82; 354/288; 354/149.11
[58] Field of Search .......... 354/81, 82, 288 A, 288 U, 354/288 C, 288 R, 149.11

[56] References Cited

U.S. PATENT DOCUMENTS

| | | | |
|---|---|---|---|
| 4,106,037 | 8/1978 | Nakamura et al. | 354/288 X |
| 4,500,184 | 2/1985 | Morizumi et al. | 354/149.11 |
| 4,875,065 | 10/1989 | Kubodera et al. | 354/288 X |
| 4,893,139 | 11/1990 | Alligood et al. | 354/149.11 X |
| 4,907,022 | 3/1990 | Myers | 354/288 X |

FOREIGN PATENT DOCUMENTS 0681965 10/1952 United Kingdom .
1434469 5/1976 United Kingdom .
2071862 9/1981 United Kingdom .

Primary Examiner—L. T. Hix
Assistant Examiner—Khanh Dang
Attorney, Agent, or Firm—Sandler, Greenblum & Bernstein

[57] ABSTRACT

In a camera provided with an operational unit including a plurality of operational components of the camera assembled therein and mounted on one side of a taking lens barrel of the camera, an opening portion for holding the camera is formed below the operational unit and extended to the a bottom surface of the taking lens barrel, and thus the taking lens, the heaviest component of all of the camera, can be surely supported at the lower portion thereof.

9 Claims, 6 Drawing Sheets

HOLDING MECHANISM FOR A CAMERA

BACKGROUND OF THE INVENTION

The present invention relates to a holding mechanism for a camera provided with an operational unit including a plurality of components of the camera assembled therein and disposed on one side of a taking lens barrel of the camera.

Recent cameras are provided with a strobe, a display unit, a large battery as a driving source and the like required for an operation of the camera. Thus, traditional style camera shape having only a lens projecting outwardly at the center thereof. This is difficult to maintain various types of styles of cameras not restricted to the traditional style have been proposed and used. One of these types, which has been relatively widely used, is provided with an operational unit integrally formed with a lens-barrel at one side thereof. The operational unit includes one or more operational components such as a strobe, a battery, a display unit and the like. In this type of the camera, however, a grip by which an operator holds the camera is provided at the side opposite to the side where the operational components are mounted, regardless of the heavy components such as the taking lens, the strobe, the battery and like that are integrally assembled there. More specifically, since the heavy components are located at a position spaced apart from the grip, a large moment is imposed on the grip when a camera is held. Thus the camera cannot be surely held, contrary to the advertisments that it can be held by one hand. Further, as illustrated in FIG. 1, although a type of camera having an operational "K" used as a grip is known, a heavy taking lens barrel "L" is also located at a position spaced apart from the grip, and thus this camera is also unbalanced in weight and not securely held. In particular, when the camera is held for a long time, a load is imposed on the wrist of an operator and thus the operator becomes tired. Therefore, when a photographing operation is carried out by a single hand using a camera having the operational unit mounted on one side of the taking lens barrel thereof, a problem arises in that camera shaking is liable to be caused.

SUMMARY OF THE INVENTION

It is therefore an object of the invention to provide an improved camera holding mechanism by which an operator of the camera is able to securely hold it for a long time.

For this purpose, according to the present invention, a holding mechanism for a camera including a taking lens, is provided. The holding mechanism comprises an opening portion successively formed with a bottom surface of said taking lens barrel of the camera.

DESCRIPTION OF THE ACCOMPANYING DRAWINGS

DESCRIPTION OF THE EMBODIMENTS

Figure 1:
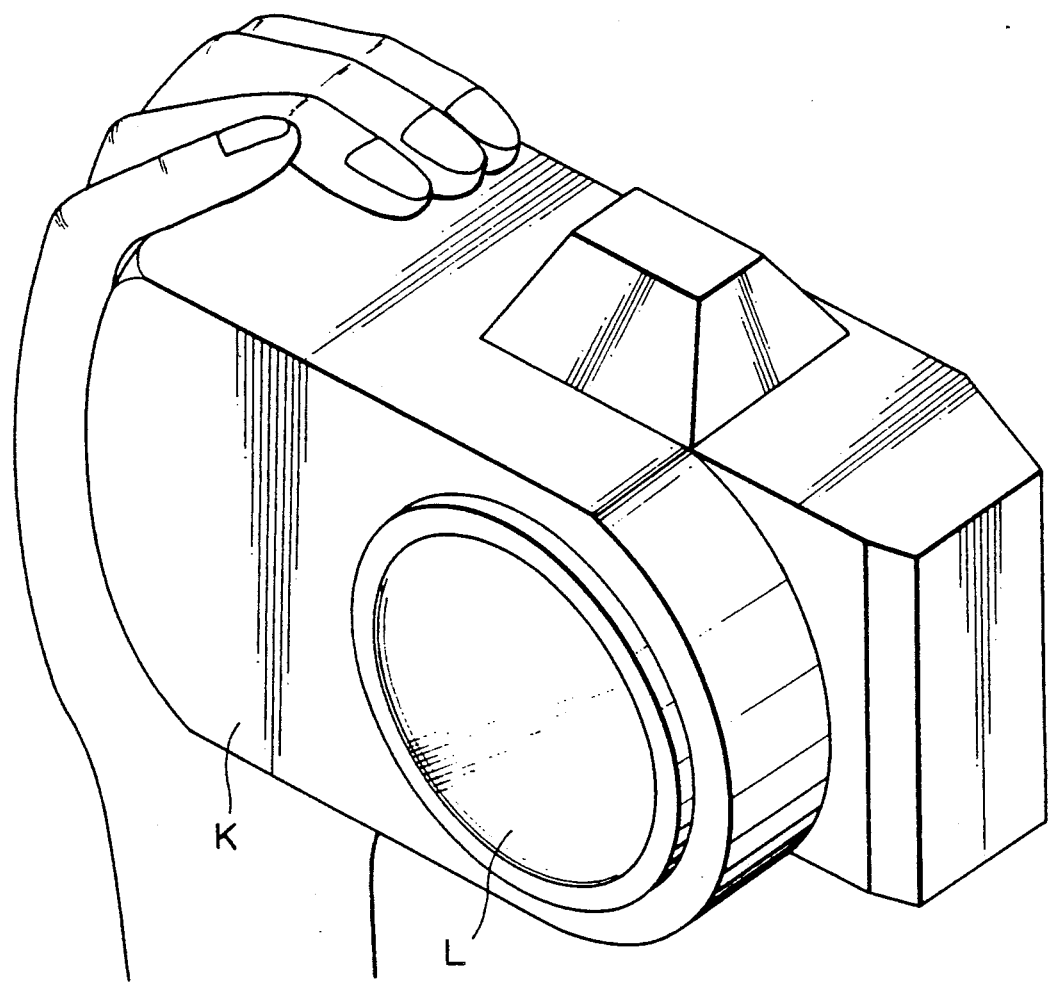
FIG. 1 is a perspective view of a conventional holding mechanism for a camera.

Referring to the drawings, an embodiment of the present invention is described hereinafter.

Figure 2A:
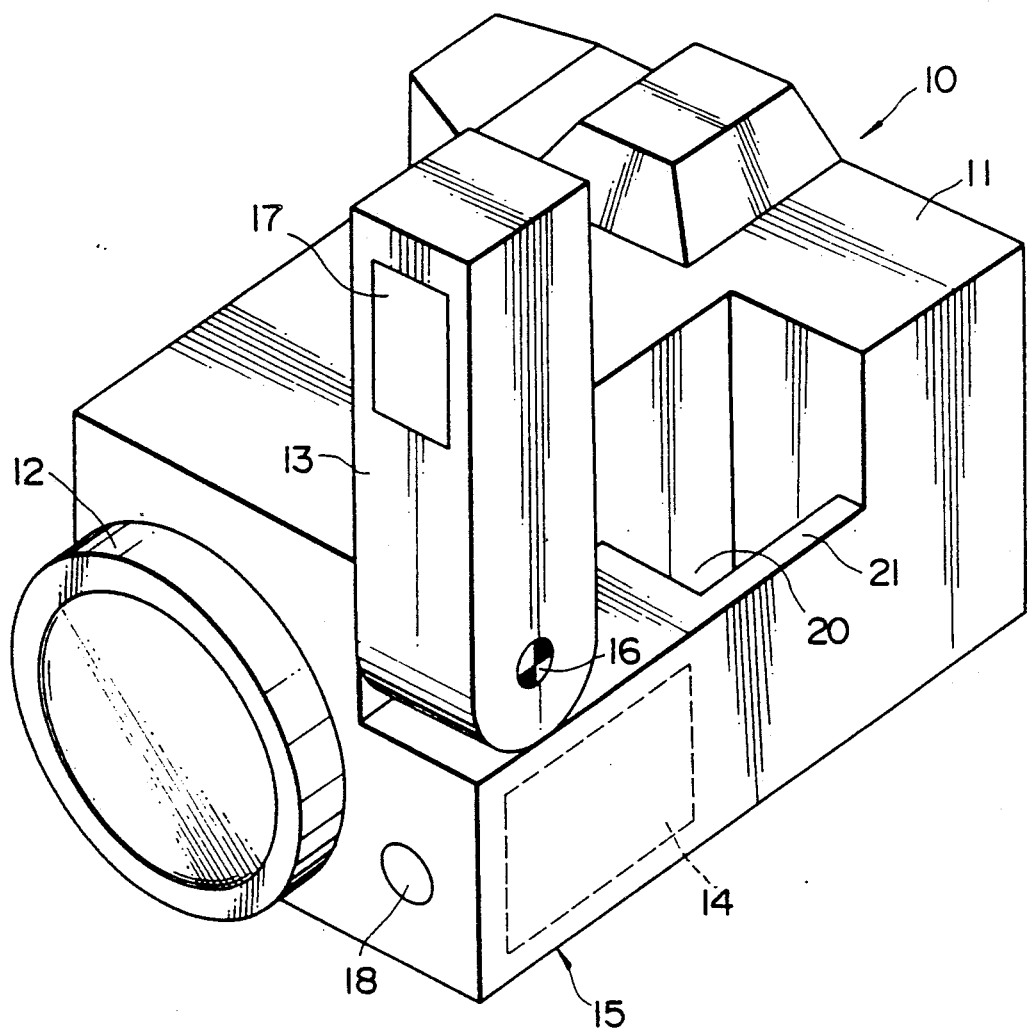
FIGS. 2A and 2B are perspective views of a camera embodying the present invention, with a strobe arm located in a raised position.
Figure 4:
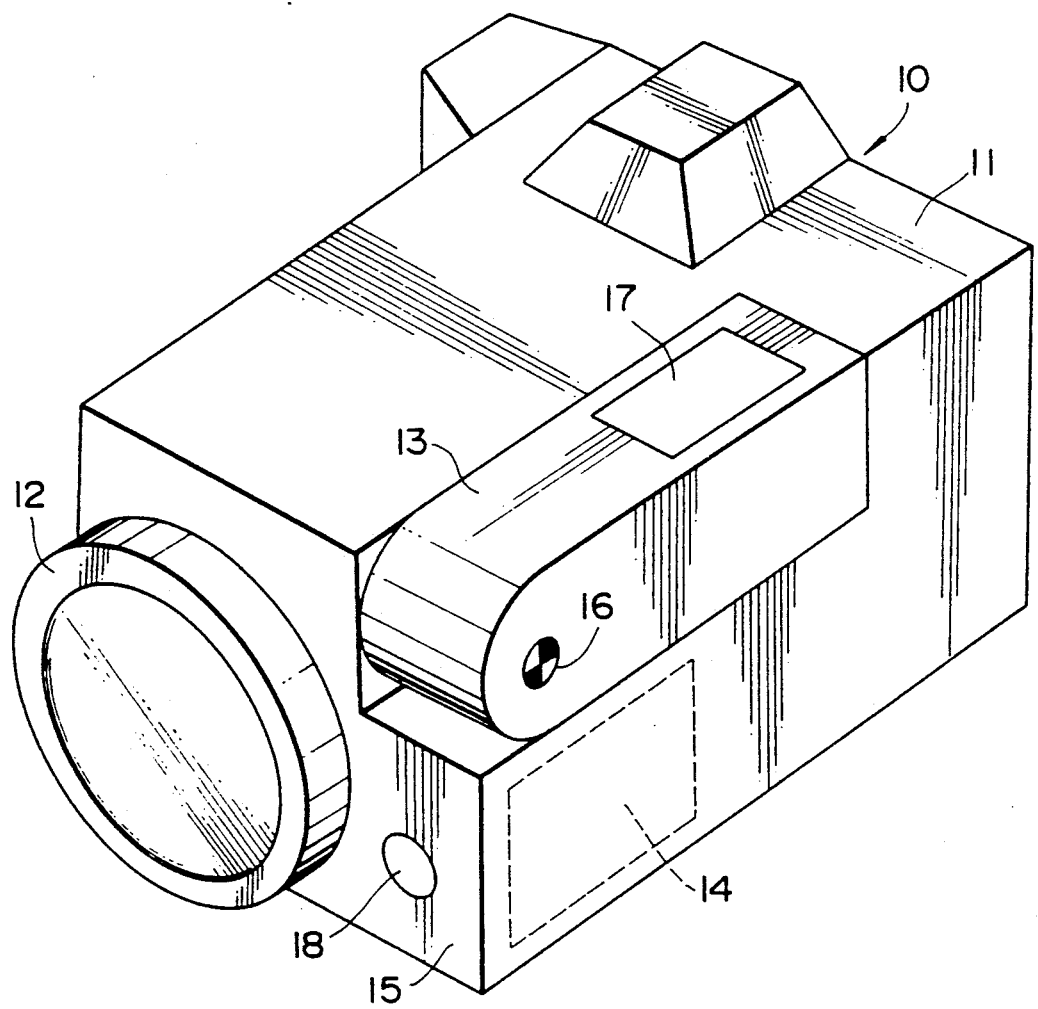
FIG. 4 is a perspective view of the camera of FIG. 2A, wherein the strobe arm is located at a lowered position.

This embodiment is a fixed single-lens reflex camera, as illustrated in FIG. 2A, comprising a body 11 integrally formed with a taking lens 12 in which the present invention is embodied. A strobe arm 13, and an operational unit 15 including an accommodating space for a battery 14 are integrally mounted on the front right side of the taking lens 12. The strobe arm 13 is mounted on the front upper portion of the operational unit 15 by a shaft 16 and has an strobe light flashing element 17 disposed at a position spaced apart from the shaft 16. The strobe arm 13 can be raised to an operating position at which the strobe light flashing element 17 is directed towards an object to be photographed, and can be lowered, as illustrated in FIG. 4, to an accommodating position at which the strobe light flashing element 17 faces upwardly.

Further, the accommodating space for the battery 14 is disposed at the front lower portion of the operational unit 15 and no component is mounted in the rear portion of the operational unit 15 except electric wiring. Note that an auxiliary light transmitting element 18 is mounted on the front surface of the operational unit 15. As is known well, the auxiliary light transmitting element 18 is used to project a contrast pattern formed by light having a predetermined wavelength, for example, infrared light, when the object is located in dark.

Figure 2B:
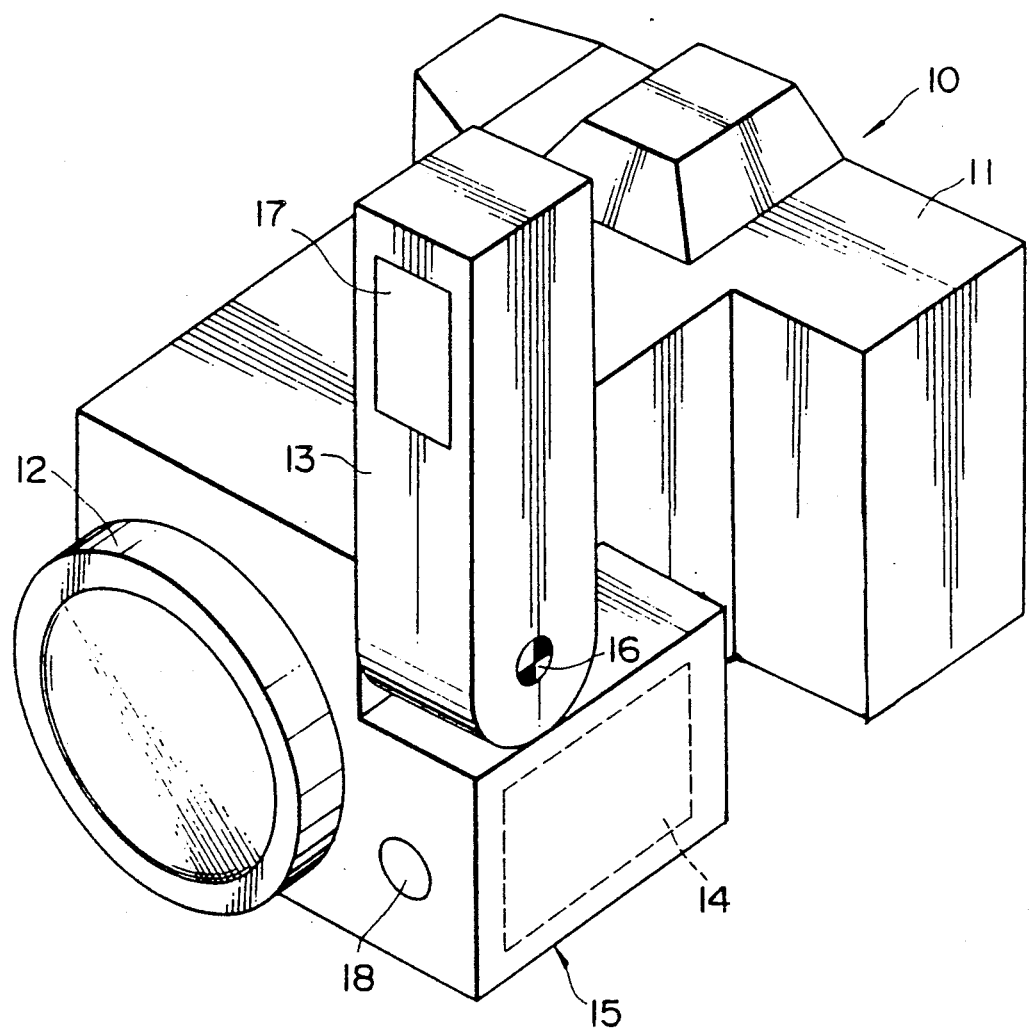

An opening portion 20 for holding the camera is formed at the rear portion of the operational unit 15 and extends to the lower surface of the taking lens 12. Although the opening 20 is formed as a hole in the embodiment illustrated in FIG. 2A, it may be formed as a hollow portion, as illustrated in FIG. 2B, formed by removing a bridge portion 21.

When the strobe arm 13 is brought down to the accommodating or storage position, the upper portion of the opening 20 for holding is covered thereby, and when the strobe arm 13 is raised up to the operating position, the upper portion of the opening portion 20 is opened as a through hole.

Figure 3:
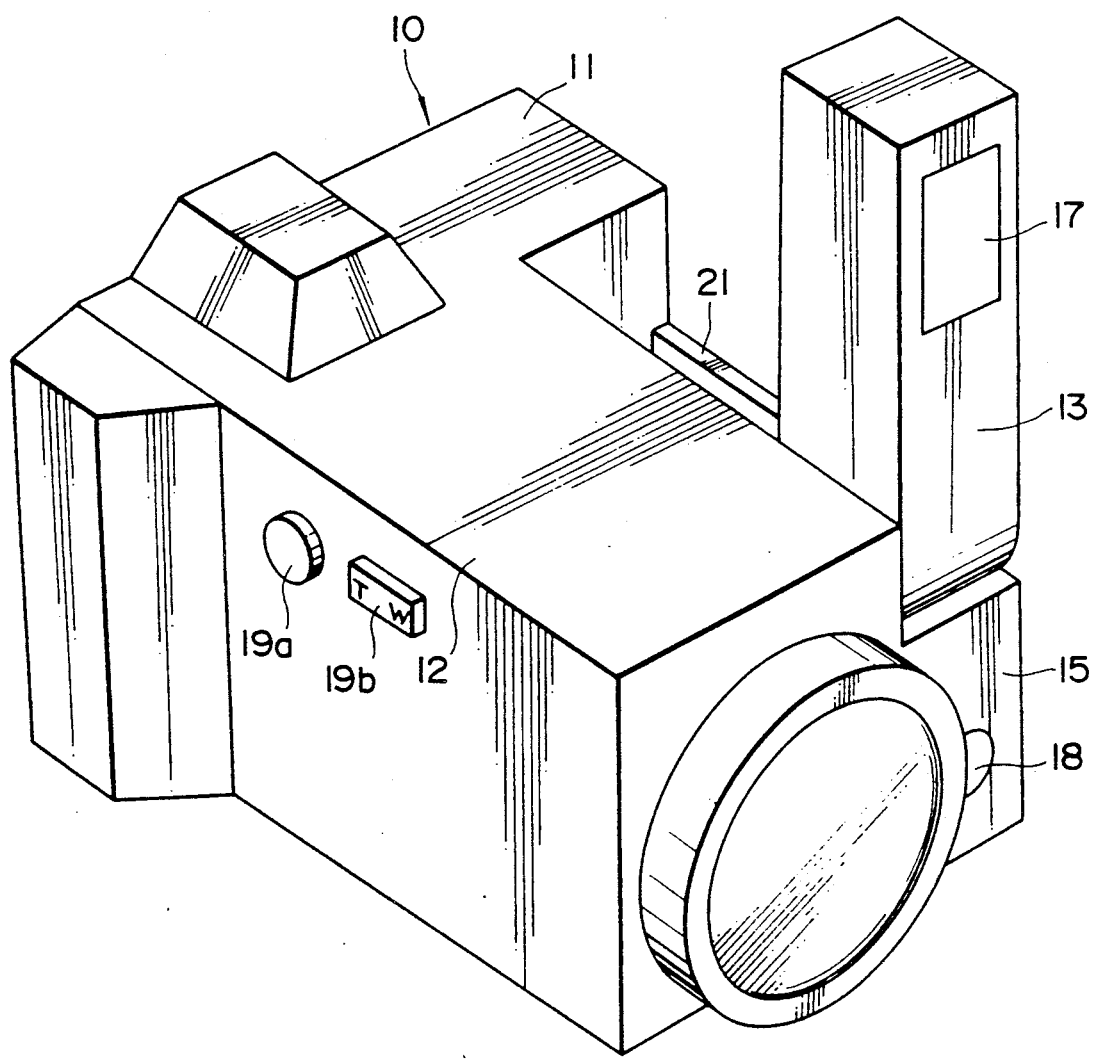
FIG. 3 is a perspective view of the camera of FIG. 2A viewed from a direction opposite to that in FIG. 2A.

A shutter release button 19a and a zoom switch 19b are disposed on the upper rear surface of the front left side of the taking lens 12, as illustrated in FIG. 3. The positions of the shutter release button 19a and the zoom switch 19b are substantially horizontally symmetrical to the opening 20 for holding with respect to the taking lens 12. More specifically, the shutter release button 19a and the zoom switch 19b are located at the position which is substantially opposite to the position of the opening 20.

Figure 5:
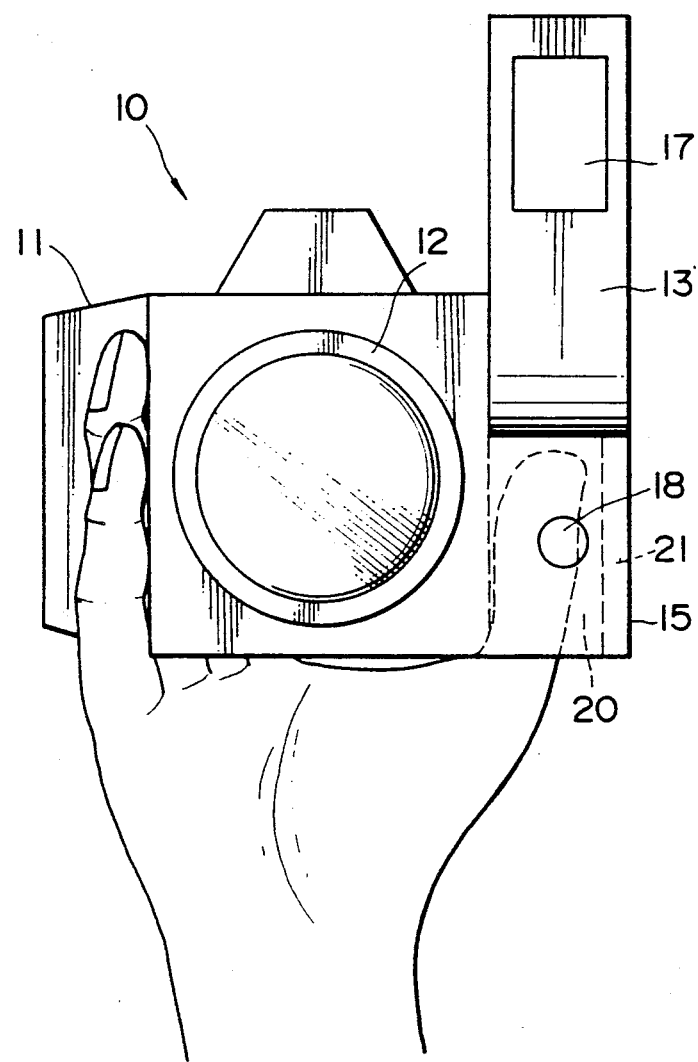
FIG. 5 is a front view of the camera of FIG. 2A as held by an operator.

Consequently, the single-lens reflex camera 10 arranged as described above is held, for example, in such a manner that the taking lens 12 is supported by the right hand at the lower portion thereof with the thumb of the left hand inserted into the opening 20, as illustrated in FIG. 5. The strobe arm 13 need not be raised when the thumb does not touch it, but preferably it is raised if the thumb touches it. Whether the thumb touches the strobe arm 13 or not depends on the size of the camera and the size of the user's hand, and thus the strobe arm 13 may be or not be raised. Since the camera 10 is held at the lower portion of the taking lens 12 which is the heaviest component of the camera and located in the vicinity of the lower portion of the heavy operational unit 15, it can be held very stably. That is, when the camera 10 is held, almost no rotational moment is imposed thereon, or even if rotational moment is imposed thereon, it can be made very small. As a result, a superior holding property can be obtained and the wrist of the user does not get tired even if the camera 10 is held for a long time so that there is no possibility that camera blur is caused by the unbalanced weight of the camera 10.

Further, since the shutter release button 19a and the zoom switch 19b can be depressed by the first or second finger with the camera held as described above, the photographing operation can be readily carried out by a single hand. In addition, since the opening 20 for holding is located at an intermediate position between the body 11 and the taking lens 12, no rotational moment is imposed on the camera 10 forwardly and backwardly.

Note that the strobe arm 13 can be raised and lowered as illustrated in the drawings, and when it is raised up, the strobe light flashing unit 17 is spaced apart from the taking lens 12 with a result that a so-called red-eye phenomenon can be prevented.

As described above, according to the present invention, in a camera provided with an operational unit including operational components of the camera assembled therein and mounted on one side of a taking lens barrel of the camera. Since an opening portion is successively formed with a bottom surface of the taking lens barrel, an operator can securely hold the taking lens barrel, the heaviest component in the camera, and the wrist of the operator is not tired even if the camera is held for a long time. As a result, in the camera according to the present invention, camera shaking can be prevented even if photographing is carried out by a single hand. Further, when an opening portion for holding is opened and closed by a strobe arm which is mounted on the operational unit, the outside appearance of the camera can be improved.

What is claimed is:

1. A holding mechanism for a camera including a taking lens barrel and a camera body, said camera body having a bottom surface, said holding mechanism comprising an opening portion successively formed with and adjacent to a bottom surface of said taking lens barrel of said camera, and an arm member arranged to be rotatable between a first position at which said arm member is opposed to an object to be photographed and a second position at which said arm covers said opening portion, said arm member being provided with a strobe light element for radiating light when the object is photographed.

2. The holding mechanism according to claim 1, wherein said arm member is provided on an upper right portion of said camera.

3. The holding mechanism according to claim 1, wherein said opening portion comprises a hole portion.

4. The holding mechanism according to claim 1, wherein said opening portion comprises a hollow portion.

5. A camera comprising:
   a taking lens;
   a taking lens barrel housing said taking lens: an operation unit positioned adjacent to said taking lens and incorporating a plurality of components of said camera, said operation unit comprising a bottom surface;
   an opening portion utilized for holding said camera, said opening portion being successively formed with and adjacent to a bottom surface of said barrel housing taking lens; and
   an arm member arranged for rotation between a first position at which said arm member is opposed to an object to be photographed and a second position at which said arm member covers said opening portion, said arm member comprising a strobe light element for radiating light when the object is photographed.

6. The camera according to claim 5, wherein said opening portion comprises a hole portion.

7. The camera according to claim 5, wherein said opening portion comprises a hollow portion.

8. The camera according to claim 5, wherein said arm member is provided on an upper right portion of said camera.

9. The camera according to claim 8, which further comprises a shutter release button provided on the opposite side of said lens barrel from said opening portion.

* * * * *